John L. Bulmer
INVENTOR.

BY Clarence A. O'Brien
and Harvey B. Jacobson
Attorneys

John L. Bulmer
INVENTOR.

BY Clarence A. O'Brien
and Harvey B. Jacobson
Attorneys

March 9, 1965 J. L. BULMER 3,172,964

TELEPHONE HAND-SET HOLDER

Filed June 2, 1961 3 Sheets-Sheet 3

John L. Bulmer
INVENTOR.

BY Clarence A. O'Brien
and Harvey B. Jacobson
Attorneys 3,172,964

TELEPHONE HAND-SET HOLDER

John L. Bulmer, Orlando, Fla., assignor to John R. Bulmer, Wexford, Pa.

Filed June 2, 1961, Ser. No. 114,530
17 Claims. (Cl. 179—150)

This invention comprises a novel and useful telephone hand-set holder and more particularly relates to a device for mechanically supporting the receiver of a telephone in operative position whereby both hands of the user are free for other purposes.

There has long been a need for some sort of mechanical aid whereby the user of a telephone may conveniently position and support the receiver adjacent his head in order that both hands of the user may be free for other purposes such as handling books or other articles, taking notes and the like during a telephone conversation. In the case of persons having frequent telephone calls, it would also be desirable to render the opening and closing of the phone circuit during the start and ending of a conversation entirely automatic without also requiring the specific attention of the user.

It is therefore the primary object of this invention to provide a simply constructed, mechanical support for a desk telephone which will hold the receiver in an easily adjusted and varied position in accordance with the desires of the user thereby freeing both hands of the user from handling the instrument.

A further important object of the invention is to provide a mechanical support for a desk telephone in accordance with the preceding object and in which the device will automatically actuate the customary circuit control switch or buttons mounted upon the cradle of the telephone stand or base.

Yet another object of the invention is to provide a mechanical support in accordance with the preceding objects which shall be of simple, sturdy, economical and long lived construction.

A still further object of the invention is to provide a supporting device in accordance with the preceding object which shall be capable of being quickly and easily attached to a conventional desk telephone set, both to the base portion thereof and to the receiver element and shall so cooperate with these elements that when the receiver is swung to a usable position, the telephone circuit is opened by freeing the circuit closing buttons of the desk telephone set base, and whereby when the telephone is moved to an inoperative or rest position, the telephone circuit actuating buttons will be closed without further attention from the user.

A still further important specific object of the invention is to provide a device in accordance with the foregoing objects which shall include a base portion securely attachable to various sizes of desk telephones, a support standard or bracket rising from the base portion, together with a movable support arm having means for securely holding the receiver of the telephone and also having connecting means operatively associated with normal telephone circuit control buttons disposed in the cradle of the desk phone and which buttons are normally adapted to be operated by positioning the receiver upon the cradle or removing it therefrom.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figures 1, 6, 7:
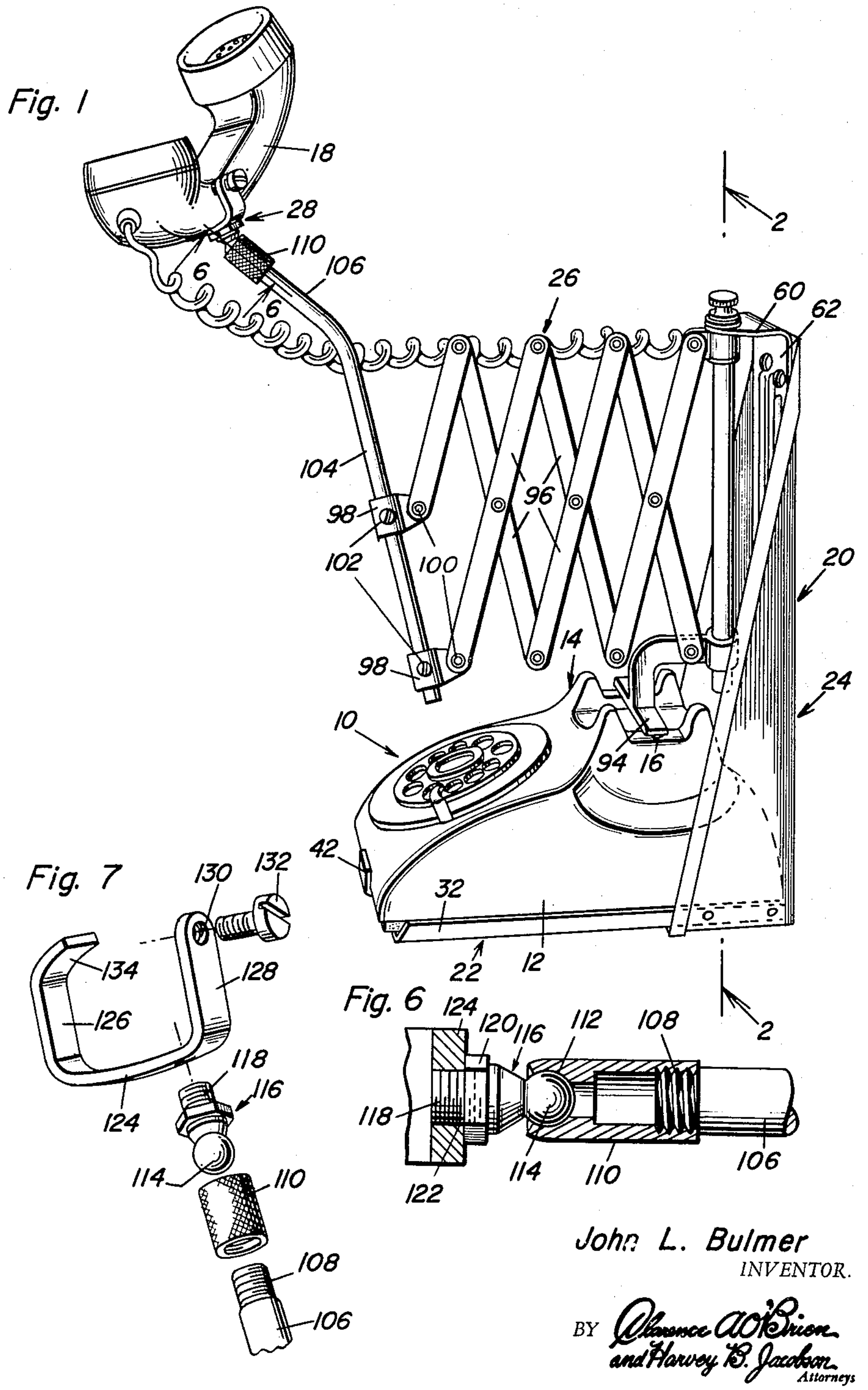
FIGURE 1 is a perspective view showing a preferred form of mechanical support in accordance with this invention and showing the same in its idle or rest position when the telephone is not in use.
FIGURE 6 is a further detailed view taken upon an enlarged scale substantially upon the plane indicated by the section line 6—6 of FIGURE 1 and showing the swivelling connection by which the telephone receiver clamp is secured to the support arm of the device.
FIGURE 7 is an exploded perspective view of the clamp element which is adapted to hold and support the telephone receiver in accordance with this invention.

In each of the illustrated embodiments of a mechanical support in accordance with the principles of this invention, there is comprehended a mechanical device consisting of an assemblage of simple components. Each embodiment includes a tray or base structure, a stanchion or standard secured to and rising from the tray together with a support arm pivotally and swingably secured to the stanchion or standard. The support arm itself has a clamping means for holding the receiver of the phone and also includes means adapted to actuate the phone switch control buttons for controlling the circuits of the telephone.

It will be understood that although the various structural embodiments illustrated in the accompanying drawings disclose different structural elements, these embodiments are illustrative of the principles of the invention only and all perform the same general functions in the same general manner for obtaining the above mentioned basic purposes of the invention.

Considering first FIGURES 1–7, it will be observed that the embodiment disclosed therein constitutes a satisfactory and proven means for performing the objects of this invention. In this embodiment there is indicated generally by the numeral 10, a conventional type of a desk telephone set, the same including the usual base 12 having a cradle 14 in which is mounted the usual pair of control buttons 16 to control the telephone circuit, these control buttons being normally held in their circuit breaking and inoperative position by the resting of the receiver 18 upon the cradle.

It is with this conventional type of desk telephone set that the mechanical support means of the present invention, indicated generally by the numeral 20 is adapted to be specifically associated in an improved manner to be subsequently set forth.

The device 20 of this invention includes as component parts thereof a tray-like base 22 to which is secured and from one end of which arises a stanchion or standard indicated generally by the numeral 24 and which latter in turn carries for pivotal swinging movement thereon a support arm indicated generally by the numeral 26 and which carries a clamp 28 by means of which the receiver 18 is held and supported.

Figures 2, 3:
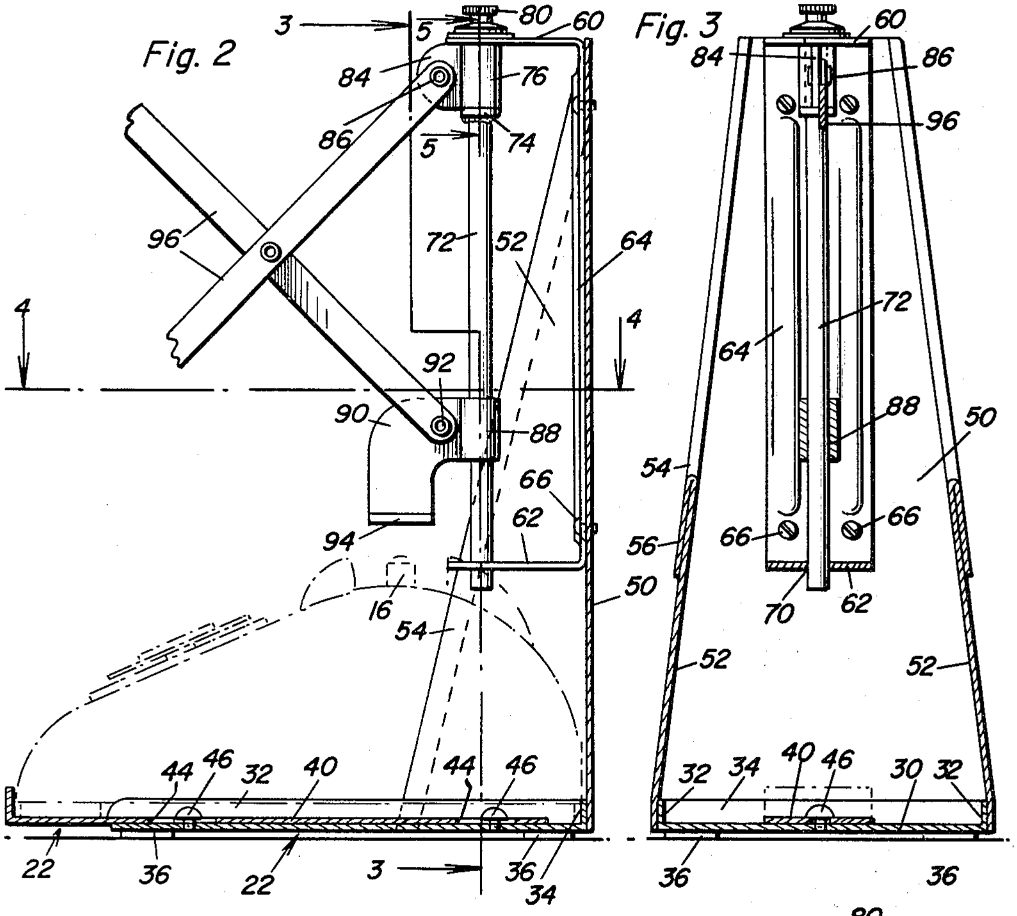
FIGURE 2 is a fragmentary detail view taken in vertical longitudinal section and upon an enlarged scale substantially upon the plane indicated by the section line 2—2 of FIGURE 1 and showing the position of the support arm of the device when the telephone is in use.
FIGURE 3 is a detailed view in vertical transverse section taken substantially upon the plane indicated by the broken section line 3—3 of FIGURE 2.
Figure 4:
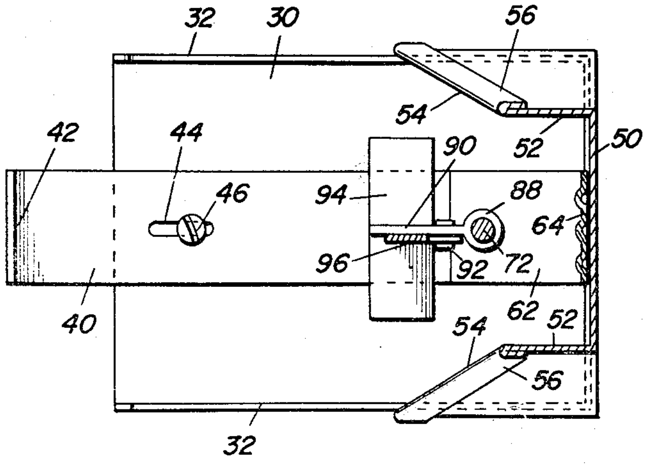
FIGURE 4 is a horizontal sectional detail view taken substantially upon the plane indicated by the section line 4—4 of FIGURE 2.

As will be seen by closer reference to FIGURES 2–4, the tray or base element 22 of the mechanical support 20 of this invention consists of a tray having a flat generally rectangular sheet of material 30 provided with upwardly extending peripheral side walls 32 together with a rear upstanding wall 34. Suitable support buttons of rubber or the like as at 36 may be disposed beneath the tray to support the same in a firm non-sliding position upon a support surface such as the top of a desk, shelf or the like. Preferably the tray is of one-piece construction and may conveniently be formed of any suitable material such as metal, a suitable plastic or the like.

As will be noted from FIGURE 4, in conjunction with FIGURE 2, the tray thus has side walls upon its sides and back, while its front end is open. The width of the tray is such that it will comfortably receive between its side walls the base portion 12 of the telephone set 10. In order to securely retain the telephone set upon the tray, there is provided an adjustable fastener in the form of a plate or strap 40 which is disposed medially and centrally and longitudinally of the base 30 of the tray and is provided with an upturned flange or lip 42 at its forward end which is adapted to embrace the front end of the telephone base 12 and clamp the base between the flange 42 and the rear wall 34 of the tray. In order to enable adjustment of the member 40 to accommodate different sizes of desk telephones, the adjusting member 40 is preferably provided with a pair of longitudinally extending slots 44 through each of which is received a fastening screw 46 which is threaded into the base 30 of the tray. By means of the screws, the fastening plate 40 may be adjusted toward and from the rear wall 34 to firmly clamp the telephone base 12 upon the tray.

Fixedly secured to and rising from the rearward portion of the tray is the stanchion or standard 24. The latter obviously may be of various different constructions in order to carry out the purposes of this invention. One suitable construction as illustrated in the drawings consists of a single sheet of material which is generally U-shaped in cross-section having a vertically extending back wall 50 together with a pair of forwardly extending side walls each indicated by the numeral 52. As will be apparent from FIGURES 2, 3 and 4, the lower ends of the side walls embrace side walls 32 of the tray base 30 and are secured thereto in any suitable manner, as for example by rivets, by welding, by fastening screws or the like. It is merely essential for the purpose of this invention that the stanchion 24 shall be securely and rigidly connected to the tray and shall rise above the desk phone 12 which is clamped to the tray in order to perform its desired functions.

It will be noted that the side walls 52 are triangular in shape have an upwardly and rearwardly inclined front edge portion 54 which is preferably stiffened as by having a flange 56 folded backwardly thereon. Similarly, the rear wall 50 of the stanchion 24 has its side edges tapering and upwardly convergent.

From a consideration of FIGURES 3 and 4 it will be observed that the vertical center line of the stanchion 24 is disposed medially between the two side walls 32 of the tray base 30. Thus a symmetrical disposition of the stanchion with respect to the tray is obtained as shown in the drawings.

A support bracket is secured to the inside upper portion of the stanchion to provide a means upon which the support arm 26 is swingably and pivotally mounted. This support bracket is of generally U-shaped configuration having parallel horizontally extending top and bottom legs 60 and 62 together with a vertically extending mid-portion or web 64. A plurality of screws or other fasteners 66 are employed to fixedly mount the web of the support bracket to the upper portion of the stanchion in the relation shown in FIGURES 2 and 3.

The horizontal upper and lower legs 60 and 62 of the support bracket are provided with vertically aligned apertures 68 and 70 therethrough. In these apertures is rotatably journalled a vertically extending pivot pin 72.

Figure 5:
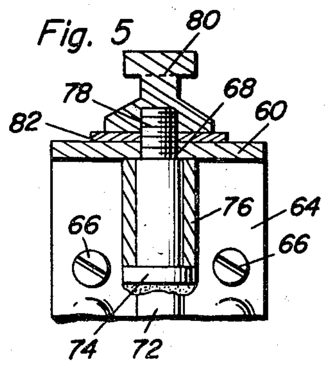
FIGURE 5 is a further detailed view taken substantially upon the plane indicated by the section line 5—5 of FIGURE 2.

Referring also to the detailed view of FIGURE 5 it will be observed that the pivot pin 72 adjacent its upper end is provided with an annular collar 74 thereon upon which is seated a spacer sleeve 76. This sleeve abuts against the collar 74 and also against the underside of the upper leg 60 of the support bracket. The uppermost end of the pin 72 is diametrically reduced and is externally threaded as at 78 for the reception thereon of a thumb nut 80 which by means of a spacer washer 82 serves to secure and hold the upper end of the pivot pin 72 to the upper horizontal leg 60 of the support bracket.

Referring now especially to FIGURES 2 and 3 it will be observed that the spacer sleeve 76 has a laterally projecting ear 84 thereon in which is received a pivot pin 86. The sleeve 76 is rotatably received upon the upper end of the pivot pin 72 and serves the dual functions of constituting a spacer to secure the pivot pin 72 in fixed vertical position with respect to the support bracket, and also functions as a pivotal support for one end of the support arm 26.

Also slidably received and journalled upon the pivot pin 72 is a lower sleeve 88 having a laterally projecting plate-like lug 90 extending therefrom which also is provided with a pivot pin 92. At its lower end the lug 90 is provided with a horizontally extending blade 94 which as shown in FIGURE 4 projects laterally to both sides of the lug 90. This blade is of such extent and is so positioned that it overlies the two previously mentioned control buttons 16 of the desk phone base. The arrangement is such that as the sleeve 88 is moved downwardly, the laterally extending blade 94 will engage and depress the button 16 thus breaking the circuit of the telephone in the same manner as if the receiver 18 were placed upon the cradle in the conventional manner. However, when the sleeve 88 is lifted, the blade 94 will be withdrawn from these control buttons and the telephone circuit will be energized just as though the telephone receiver 18 were lifted from its cradle in the usual manner.

The sleeve 88 thus also serves two functions, first, to provide a slidable support for the blade 94 which actuates the control buttons of the telephone circuit, and second to provide a pivotal support at 92 for the extremity of the support arm 26. This support arm thus is provided with a pair of pivotal connections at 86 and 92 respectively to the sleeves 76 and 88. Each of the sleeves is rotatable upon the pivot pin 72, and although the sleeve 76 is held against sliding movement thereon by virtue of its engagement between the collar 74 and the upper arm 60 of the support bracket, the sleeve 88 is vertically or axially slidable upon the pivot pin 72.

Referring now especially to FIGURE 1 in conjunction with FIGURE 2, it will be observed that the support arm 26 consists of a plurality of pivotally interconnected links each indicated by the numeral 96 and which links constitute a conventional extensible element, commonly known as a scissors or a lazy-tong arrangement. The two endmost links as shown in FIGURES 1 and 2 are pivotally connected by the previously mentioned pivot pins 86 and 92 to the sleeves 76 and 88 upon the pivot pin 72 of the stanchion. At its other end, the support arm is provided with a pair of generally cylindrical clamps each indicated at 98 which are pivoted to the extremities of the links as by pivot pins 100. The clamps 98 are fixedly secured in adjusted position as by fastening screws 102 to the lower end of the rod 104.

As shown best in the detailed views of FIGURES 6 and 7, in conjunction with FIGURE 1, it will be observed that the angulated upper end portion 106 of the rod 104 is externally threaded as at 108 and receives thereon a cylindrical swivel connector 110. This connector is provided at one extremity with a spherical seat 112 in which is swivelly retained a swivel head or ball 114 forming one extremity of a swivel connector 116. The connector 116 comprises an externally threaded stem 118 provided with a lock nut 120 and is threadedly engaged in the internally threaded bore 122 of the clamp 28.

This clamp is of generally U-shaped configuration having a central web portion 124 through which passes threaded bore 122 previously mentioned and has a pair of generally parallel side arms as at 126 and 128. The arm 128 has an internally threaded bore 130 for receiving the fastening screw 132 therein. The other arm 126 is provided with an inturned hook extremity as at 134. The arrangement is such that the U-shaped clamp embraces the mid-portion or handgrip of the receiver 18 with the hooked extremity 134 underlying the receiver and with the fastener screw 132 serving to fixedly secure the clamp to the receiver. In this manner the receiver is fixed to the clamp, while the clamp itself by means of the swivel connector 116 is swivelly mounted on the upper end of the rod 104 for swivelling movement in any direction with respect thereto.

As so far described it will now be apparent that by properly adjusting the swivel connection, the receiver may be adjusted to any desired position found to be most convenient for the user, in readiness for use. Further, by moving the scissors or lazy-tong arrangement of the support arm 26 away from the pivot pin 72, the receiver may be brought to the user. During this movement, it is evident that the extension of the scissors or lazy-tong connection would serve to raise the sleeve 88 and thus lift the blade 94. Consequently, as the receiver is moved towards the user, the blade 94 releases the control button 16 and energizes the telephone circuit. Therefore with a single movement the receiver may be moved from its rest or inoperative position into a position of use and which has been adjusted to the most convenient position for the user. When the telephone conversation is finished, a single movement will again restore the receiver to its idle position, and the collapsing or folding of the scissors or lazy-tong mechanism will in turn lower the sleeve 88 and thus cause the blade 94 to depress the control button 16 and deactivate the circuit of the telephone.

This form of the invention is exceedingly simple and compact in its construction, and very unobtrusive in appearance. It can be readily applied to any of the various sizes of desk telephone sets and being firmly attached to the telephone set, there is maintained a proper coordination of the control switch blade 94 with respect to the control button 16 of the desk set, while the telephone receiver itself may be readily adjusted as desired to suit the convenience and accessibility of the individual user.

In the foregoing embodiment of the invention the support arm 26 was constructed as a longitudinally extensible and retractible arm. It is also within the scope of the invention, however, to provide a non-extensible support arm and yet enjoy all of the advantages of the invention.

In the arrangement shown in FIGURES 8–11, there is shown exactly the same type of desk telephone set 10 with its base 12, cradle 14, telephone circuit control buttons 16 and telephone receiver 18 as previously described. In addition, the support device in this form of the invention likewise includes the tray or base 22 of the same construction previously described together with a stanchion or standard 24 which is likewise of the same construction. However, a somewhat modified construction is provided for mounting the rigid non-extensible support arm 150 to the stanchion and for connecting this support arm to the control buttons 16. However, indicated generally by the numeral 152 is exactly the same type of swivelling connection by which the clamp assembly 28 is swivelling secured to the end of the support arm 150 and which swivel connection was shown and described in connection with FIGURES 6 and 7.

Figures 8, 9, 10, 11, 12:
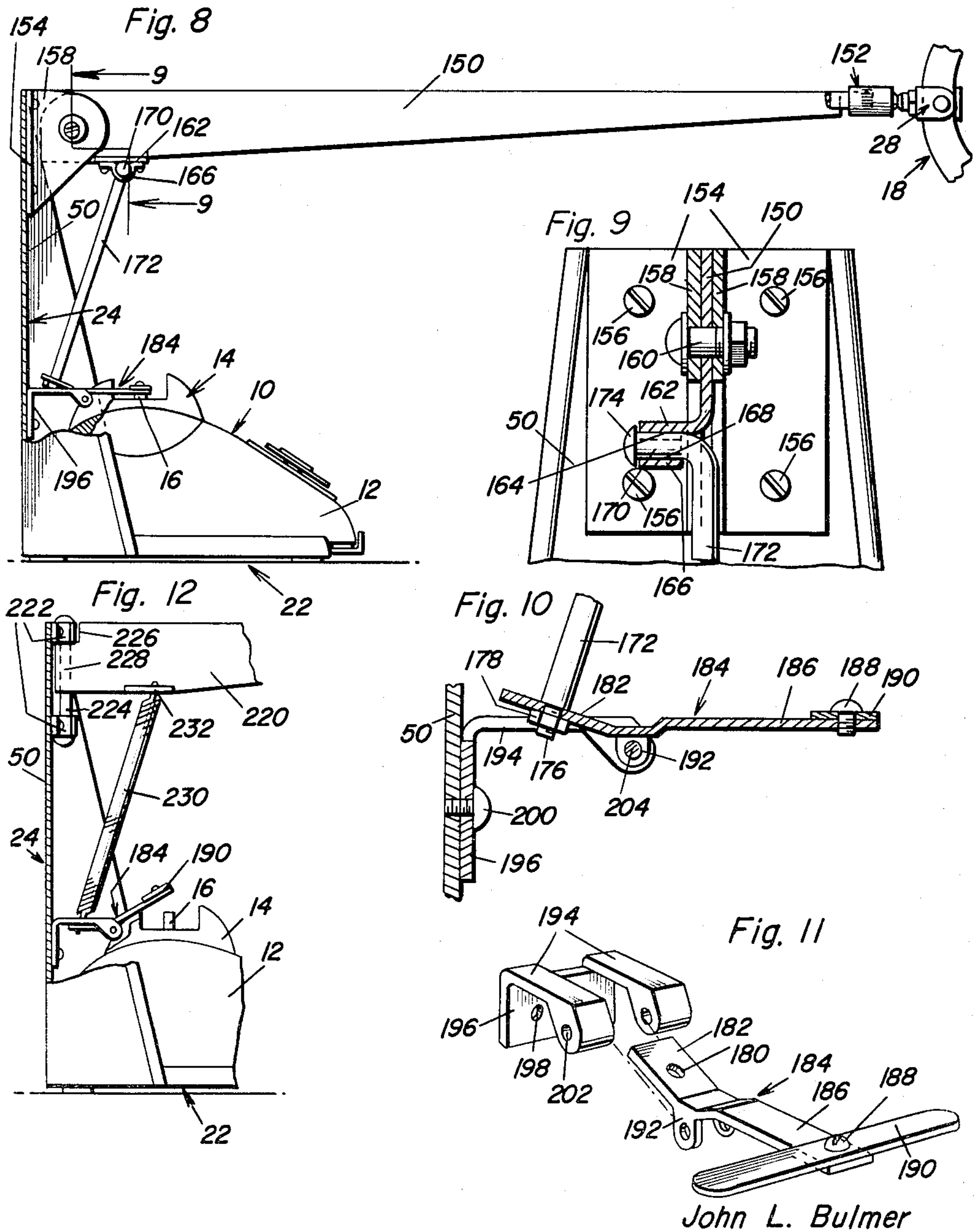
FIGURE 8 is a side elevational view of a modified form of the device in accordance with this invention, a part of the telephone receiver being broken away and part of the support standard of the device being broken away to show certain parts of the mechanism.
FIGURE 9 is a vertical transverse sectional detailed view taken upon an enlarged scale substantially upon the plane indicated by the broken section line 9—9 of FIGURE 8.
FIGURE 10 is a detailed view in vertical section showing a lever element for interconnecting movement of the support arm of the device with the telephone switch control button actuating means.
FIGURE 11 is an exploded perspective view of the support bracket on the device and the control button actuating lever.
FIGURE 12 is a fragmentary view similar to the left side portion of FIGURE 8 but showing a still further modified construction in accordance with the invention.

Referring now particularly to FIGURES 8 and 9, it will be observed that the support means by which the support arm 150 is pivotally secured to the stanchion 24 consists of a pair of L-shaped support brackets. Each support bracket includes a flat plate 154 pivotally secured as by fastening bolts 156 to the vertically extending back wall 50 of the stanchion 24. The two support brackets are provided with perpendicular, parallel vertically extending flanges 158 which are spaced from each other a sufficient distance to receive therebetween the flat blade which comprises a rear extremity of the support arm 150. A fastening bolt 160 extending through the support arm 150 and the pair of bracket flanges 158 serves to pivotally secure the support arm thereto for vertical swinging movement.

Still comparing FIGURES 8 and 9 it will be observed that the lower surface of the support arm 150 adjacent its pivotal connection to the bracket flanges 158, is provided with a struck-out laterally projecting flange 162 having a cylindrical recess 164 therein. Removably secured to the flange 162 is a bearing cap 166 likewise having a semi-cylindrical recess 168 therein. The cap 166 and the flange 162 cooperate to provide a journal for receiving pivotally therein the laterally projecting cylindrical extremity 170 of a connecting rod 172. The extremity is preferably headed as at 174 to prevent accidental disengagement from its journal connection to the support arm 150. The connecting rod 172 is rigid and its lower end is externally threaded as at 176 to receive a fastening nut 178. Referring now also to FIGURES 10 and 11 it will be observed that the threaded extremity of the connecting rod 172 extends through an aperture 180 in one end portion 182 of an actuating lever indicated generally by the numeral 184. The other end portion 186 of the actuating lever has secured thereto as by fastening screw 188, a transversely extending switch actuating blade 190 which is adapted to overlie and actuate the control buttons 16 in the same manner as the blade 94 of the preceding embodiment.

The actuating lever 184 is provided with a pair of apertured lugs 192 and the lugs and the end portion 182 of this lever is received between a pair of parallel horizontally extending fulcrum arms 194 each carried by and extending laterally from a lower mounting bracket 196. The bracket is apertured as at 198 for the reception of screws 200 by which the bracket is secured to the rear wall 50 of the stanchion. The fulcrum arms 194 are likewise provided with aligned bores 202 for the reception of fastening pin 204 which thereby pivotally connects the actuating lever to the lower support bracket.

From an inspection of FIGURE 8, it will now be understood that the upwardly pivoted position of the support arm 150 is the rest or idle position thereof. When it is desired to use the telephone, the support arm 150 is moved downwardly thereby lowering the connecting rod 172 and pivoting the actuating lever 184 to lift the switch blade 190 and thus disengage the control buttons 16. The latter thus energize the telephone circuit in the same manner as when a telephone receiver is lifted from the cradle of the desk set. When the conversation is finished, the support arm 150 is lifted thereby in turn drawing upwardly the connecting rod 172 and depressing through the actuating lever 184, the switch blades 190 downwardly to depress the control buttons 16 and thus deactivate the telephone circuit. It will be appreciated that if desired resilient means may be connected to the connecting rod 172 and/or the support arm 150 to normally retain these elements in their raised, idle and inactive positions, if desired.

In the embodiments of FIGURES 8–11, a rigid connecting rod 172 was interposed between the support arm 150 and the actuating lever 184. It is however possible to utilize a resilient connection at this location. For an example of such construction attention is now directed to the modified construction of FIGURE 12.

It will be understood that in this modification the construction is identical with that set forth in connection with FIGURES 8–1 except for the following particulars. There is provided a non-extensible relatively rigid horizontally extending blade like support arm 220 which is of the same construction as the arm 150, has the same connection to the clamping means 28 as that of the preceding embodiment except that it differs in a manner in which the arm is pivotally mounted upon the stanchion and is connected to the switch actuating lever 184. Consequently, as in the preceding embodiment, the same numerals have been employed to designate the same elements in the various embodiments.

At the upper end of the back wall 50 of the stanchion 24 there is provided a pair of vertically spaced apertured lugs, pivot sleeves or the like as at 222 in which is disposed a vertically positioned pin 224. The rearward and upper portion of the support arm 220 is notched or cutaway as at 226 to provide clearance for the uppermost of the bearing members 222, while the rearward extremity of the support arm is rolled upon itself to provide a cylindrical sleeve or hinge portion 228 by which the arm is pivotally and slidably secured to the pivot pin 224. The arm can thus swing about the vertical axis of the pin and can also move axially along the pin as desired.

In place of the solid connecting rod 172 of the preceding form of the invention there is provided a coil spring 230. This spring has its lower extremity secured to the previously mentioned aperture 180 of the actuator lever 184 and its upper extremity to an apertured lug 232 which projects laterally from the support arm 220. The spring 230 thus provides a resilient connection between the support arm and the actuating lever which functions in the same manner as the rigid connecting rod 172 to effect the opening and closing of electrical circuit by actuation of the switch buttons 16.

It will be understood that in all forms of the invention illustrated herein there is provided the same basic features. Thus, the telephone circuit is mechanically actuated to opened and closed position in response to movement of the support arm to position the receiver in either an operative or an idle position.

Further, the stanchion and tray construction are so designed as to snugly accommodate and firmly retain the telephone test set therein rendering for all practical purposes an integral construction of this device with the conventional telephone desk set. The telephone receiver is capable of being readily adjusted to any conceivable position which may be desired by the user and then maintaining the telephone in that position while permitting it to be moved between an idle or rest position and an operating position. This movement is effected either by a push-pull type of connection such as the lazy-tong or scissors arrangement of the preferred embodiment of the invention, or by a rigid arm construction which may be pivotally raised or lowered.

Further, either a rigid or resilient connection may be provided between the support arm and the actuating lever by which the circuit control buttons of the telephone set are operated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mechanical support for the receiver of a telephone desk set of the type having cradle switch buttons controlling the circuits of the telephone and actuatable by the hand set, said mechanical support comprising a tray having marginal upstanding portions for embracing and for attachment to and for receiving and retaining the base of a telephone desk set, a stanchion secured to and rising from said tray, a support arm projecting laterally from said stanchion, means for securing said support arm to a telephone receiver for supporting the latter, means movably mounting said support arm upon said stanchion for movement selectively to an idle or rest position and to a position of use, switch actuating means movable relative to the switch buttons of the cradle of a telephone desk set for actuating said switch buttons, connecting means attached to said control arm and to said switch actuating means for causing the latter through said swtich buttons to respectievly open and close the telephone circuit when the support arm is at its idle and operative position, said stanchion including laterally projecting support brackets thereon, a pivot pin carried by said brackets, said support arm being swingably journalled on said pivot pin.

2. A device for supporting the handset of a telephone desk set of the type having cradle switch buttons in selected positions remote from the base of a desk set comprising a tray having means thereon for securing the base of a desk set thereon, a stanchion fixedly secured to and rising from said tray at one end thereof, a support arm movably secured to the upper portion of said stanchion and projecting laterally therefrom across said tray, a handset holder swivelly secured to said support arm, actuating means attached to said support arm adjacent said stanchion and operable upon movement of said receiver holder remote from and adjacent to said tray to operate said cradle switch button to respectively close and open the telephone circuit, said tray comprising a pair of plates connected together for relative sliding movement for longitudinal extension of said tray, said plates having upstanding portions embracingly engaging and retaining therebetween the base of a desk set.

3. The combination of claim 2 wherein said stanchion comprises one of said upstanding portions.

4. A device for supporting the handset of a telephone desk set of the type having cradle switch buttons in selected positions remote from the base of a desk set comprising a tray having means thereon for securing the base of a desk set thereon, a stanchion fixedly secured to and rising from said tray at one end thereof, a support arm movably secured to the upper portion of said stanchion and projecting laterally therefrom across said tray, a handset holder swivelly secured to said support arm, actuating means attached to said support arm adjacent said stanchion and operable upon movement of said receiver holder remote from and adjacent to said tray to operate said cradle switch button to respectively close and open the telephone circuit, said stanchion constituting one of said upstanding portions, said stanchion being generally U-shaped in horizontal cross-section and including a flat vertical plate secured to the entire length of one edge of said tray and having parallel vertical side plates secured to adjacent edges of said tray.

5. A device for supporting the handset of a telephone desk set of the type having cradle switch buttons in selected positions remote from the base of a desk set comprising a tray having means thereon for securing the base of a desk set thereon, a stanchion fixedly secured to and rising from said tray at one end thereof, a support arm movably secured to the upper portion of said stanchion and projecting laterally therefrom across said tray, a handset holder swivelly secured to said support arm, actuating means attached to said support arm adjacent said stanchion and operable upon movement of said receiver holder remote from and adjacent to said tray to operate said cradle switch button to respectively close and open the telephone circuit, upper and lower laterally projecting support brackets fixed to said stanchion above a desk set base, a vertical pivot pin supported by said brackets, said support arm being swingably journaled on said pivot pin.

6. The combination of claim 5 including upper and lower fasteners on said support arm rotatably mounted on the upper and lower portions of said pin, said lower fastener comprising a part of said actuating means.

7. The combination of claim 6 wherein said upper fastener is rotatably but non-slidably mounted on said pivot pin and said lower fastener is rotatable and slidable on said pivot pin.

8. A device for supporting the handset of a telephone desk set of the type having cradle switch buttons in selected positions remote from the base of a desk set comprising a tray having means thereon for securing the base of a desk set thereon, a stanchion fixedly secured to and rising from said tray at one end thereof, a support arm movably secured to the upper portion of said stanchion and projecting laterally therefrom across said tray, a handset holder swivelly secured to said support arm, actuating means attached to said support arm adjacent said stanchion and operable upon movement of said receiver holder remote from and adjacent to said tray to operate said cradle switch button to respectively close and open the telephone circuit, upper and lower laterally projecting support brackets fixed to said stanchion above a desk set base, a vertical pivot pin supported by said brackets, said support arm being swingably journaled on said pivot pin, said receiver holder including a generally vertically extending post, said support arm including upper and lower fasteners secured to said post at vertically adjustable positions thereon.

9. The combination of claim 8 wherein said support arm is longitudinally extensible.

10. A device for supporting the handset of a telephone desk set of the type having cradle switch buttons in selected positions remote from the base of a desk set comprising a tray having means thereon for securing the base of a desk set thereon, a stanchion fixedly secured to and rising from said tray at one end thereof, a support arm movably secured to the upper portion of said stanchion and projectting laterally therefrom across said tray, a handset holder swivelly secured to said support arm, actuating means attached to said support arm adjacent said stanchion and operable upon movement of said receiver holder remote from and adjacent to said tray to operate said cradle switch button to respectively close and open the telephone circuit, said support arm being rigid.

11. A handset support attachment for a telephone desk set of the type having a base with cradle switch buttons operable by said handset for controlling the desk set circuits, said attachment comprising a tray, means securing said desk set base upon said tray, a standard mounted on and rising from one end of said tray, a handset support arm movably mounted upon and projecting laterally from said standard, actuating means operatively engageable with and actuating said cradle switch buttons in response to predetermined movement of said support arm, said actuating means including an actuating member engageable with said cradle switch buttons and connected to both said standard and arm and movable relative to each, the connection of said actuating member to said support arm being longitudinally rigid and both non-contractible and non-extensible in length.

12. The combination of claim 11 including a pair of spaced, laterally projecting bracket arms mounted on said standard, a pivot pin mounted in said bracket arms, said support arm being disposed between said bracket arms and mounted upon said pivot pin and being pivotally movable between said support arms.

13. The combination of claim 12 wherein said bracket arms are vertically spaced and said pivot pin is vertically disposed with said support arm being horizontally swingable about a vertical axis.

14. The combination of claim 11 including a vertical pivot pin mounted upon said standard, said support arm and said actuating member being each rotatably and slidably journaled on said pivot pin.

15. The combination of claim 11 wherein said actuating member comprises a one piece body having a sleeve portion rotatably and slidably mounted upon a vertical pivot pin carried by said standard.

16. The combination of claim 11 including a vertical pivot pin fixedly mounted upon said standard in laterally spaced relation thereto, a sleeve rotatably mounted on said pivot pin but fixed against sliding movement thereon, said actuating member being journaled on said pivot pin for both rotary and sliding movement, said support arm being pivotally connected to both said sleeve and actuating member.

17. The combination of claim 16 wherein said support arm is longitudinally extensible comprising a lazy tong linkage with the two pivotally connected limbs at one end having said connection to said sleeve and actuating member.

References Cited by the Examiner

UNITED STATES PATENTS

| | | | |
|---|---|---|---|
| 756,508 | 4/04 | Konigstein | 179—150 |
| 2,260,703 | 10/41 | Daly | 179—148 |
| 2,519,746 | 8/50 | De Hart et al. | 179—148 |
| 2,766,330 | 10/56 | Olsen | 179—150 |

FOREIGN PATENTS

| | | |
|---|---|---|
| 144,781 | 6/20 | Great Britain. |
| 555,248 | 1/57 | Italy. |

ROBERT H. ROSE, *Primary Examiner.*

THOMAS B. HABECKER, WILLIAM C. COOPER, *Examiners.*